United States Patent
Arakawa

(10) Patent No.: US 10,890,522 B2
(45) Date of Patent: Jan. 12, 2021

(54) RUBBER FRICTION TEST METHOD

(71) Applicant: TOYO TIRE & RUBBER CO., LTD., Itami (JP)

(72) Inventor: Koji Arakawa, Itami (JP)

(73) Assignee: TOYO TIRE CORPORATION, Itami (JP)

(*) Notice: Subject to any disclaimer, the term of this patent is extended or adjusted under 35 U.S.C. 154(b) by 229 days.

(21) Appl. No.: 16/102,962

(22) Filed: Aug. 14, 2018

(65) Prior Publication Data
US 2019/0078999 A1 Mar. 14, 2019

(30) Foreign Application Priority Data

Sep. 8, 2017 (JP) .................................. 2017-172998

(51) Int. Cl.
*G01N 19/02* (2006.01)
*G01M 17/02* (2006.01)

(52) U.S. Cl.
CPC ............ *G01N 19/02* (2013.01); *G01M 17/02* (2013.01)

(58) Field of Classification Search
CPC .... G01M 17/02; G01M 13/04; G01M 17/022; G01N 19/02; G01N 3/56; G01N 2203/0075; B60C 23/0408; G01P 15/18; G01P 15/0891; A61B 2562/0219; B25B 23/14; G01L 3/00; G01G 19/07; G01G 19/08; B01J 2219/00315; G01D 3/02; G01D 3/0365; G06F 17/40; G01B 21/042; G01B 21/045; G01B 21/04
USPC ............. 73/9, 146; 702/141, 41, 175, 86, 95
See application file for complete search history.

(56) References Cited

U.S. PATENT DOCUMENTS

| 3,852,993 | A | * | 12/1974 | Bronovets | ................ | G01N 3/52 |
| | | | | | | 73/12.06 |
| 4,813,266 | A | * | 3/1989 | Nash | ...................... | G01N 19/02 |
| | | | | | | 702/141 |
| 5,864,056 | A | * | 1/1999 | Bell | ........................ | B60C 11/24 |
| | | | | | | 73/146 |

(Continued)

FOREIGN PATENT DOCUMENTS

JP 2016-23984 A 2/2016

OTHER PUBLICATIONS

National Standard of the People's Republic of China for Determination of the Friction Coefficient of Plastic Films and Sheets GB 10006-88, Plastics Processing Applied Science Research Institute, Ministry of Light Industry, pp. 446-450, China Standards Press; with English Translation; Cited in CN OA dated Aug. 28, 2020. (13 pages).

(Continued)

*Primary Examiner* — John Fitzgerald
*Assistant Examiner* — Truong D Phan
(74) *Attorney, Agent, or Firm* — Westerman, Hattori, Daniels & Adrian, LLP

(57) ABSTRACT

In a rubber friction test method of measuring a friction coefficient of a rubber test specimen by relatively moving the rubber test specimen and a test road surface in a state in which the rubber test specimen is pressed to the test road surface by applying a load, the method includes a step of measuring a resistance force acting on the rubber test specimen while accelerating or decelerating a speed of the relative movement, and a step of calculating the friction coefficient based on the applied load and the measured resistance force.

19 Claims, 3 Drawing Sheets

(56) References Cited

U.S. PATENT DOCUMENTS

| | | | |
|---|---|---|---|
| 6,321,586 B1* | 11/2001 | Wojtowicz | G01N 3/56 73/9 |
| 6,430,520 B1* | 8/2002 | Tranquilla | G01G 23/10 702/141 |
| 2002/0194895 A1* | 12/2002 | Germinario | G01N 19/02 73/9 |
| 2003/0010101 A1* | 1/2003 | Zur Loye | G01M 15/08 73/114.05 |
| 2004/0040781 A1* | 3/2004 | Fujioka | B62D 5/006 180/446 |
| 2004/0237639 A1* | 12/2004 | Bandou | G01N 27/60 73/146 |
| 2005/0098081 A1* | 5/2005 | Fujioka | G01L 17/00 116/34 B |
| 2005/0134445 A1* | 6/2005 | Ogawa | B60C 23/0416 340/447 |
| 2005/0199168 A1* | 9/2005 | Mizutani | B63H 25/24 114/144 R |
| 2006/0219000 A1* | 10/2006 | Miyoshi | B60T 8/1725 73/146 |
| 2006/0277973 A1* | 12/2006 | Bailey | G01N 19/02 73/9 |
| 2008/0156067 A1* | 7/2008 | Lin | G01N 19/02 73/9 |
| 2011/0015906 A1* | 1/2011 | Bian | B60T 8/172 703/2 |
| 2011/0138899 A1* | 6/2011 | Inoue | G01M 17/022 73/146 |
| 2012/0146944 A1* | 6/2012 | Lee | G06F 3/044 345/174 |
| 2013/0019712 A1* | 1/2013 | Murakami | B60K 6/445 74/7 E |
| 2014/0225346 A1* | 8/2014 | Bettin | B62K 15/008 280/236 |
| 2015/0219529 A1* | 8/2015 | Akiyama | G01M 13/025 73/115.01 |
| 2018/0088005 A1* | 3/2018 | Provana | B60C 19/00 |

OTHER PUBLICATIONS

Office Action dated Aug. 28, 2020, issued in counterpart CN Application No. 201810946190.4, with English Translation. (15 pages).

* cited by examiner

RUBBER FRICTION TEST METHOD

BACKGROUND OF THE INVENTION

Field of the Invention

The present invention relates to a rubber friction test method which measures a friction coefficient of a rubber test specimen by relatively moving the rubber test specimen and a test road surface in a state in which the rubber test specimen is pressed to the test road surface by applying a load.

Description of the Related Art

Conventionally, there has been carried out a friction test which evaluates a friction property of a rubber material employed in an automotive tire by using a test road surface which simulating an actual road surface, and a rubber test specimen. Specifically, the frictional force is measured by pressing the rubber test specimen to the test road surface and moving the rubber test specimen on the test road surface while sliding.

In the meantime, the friction coefficient of the rubber has been known to be dependent from a slip rate. In order to evaluate a slip rate dependency of the friction coefficient, it is necessary to make plural times of friction tests in which the slip rate is differentiated. However, in the conventional friction test method, the test road surface is polished and the road surface property is changed according to repeat of the friction test. As a result, there has been a problem that a measurement precision of the rubber friction coefficient is lowered. Therefore, the following Patent Document 1 is adapted to use a reference rubber, measure a reference rubber friction coefficient which is a friction coefficient of a test road surface in relation to the reference rubber, and apply a polishing treatment to the test road surface in the case that the reference rubber friction coefficient does not reach a previously set target value.

PRIOR ART DOCUMENT

Patent Document

Patent Document 1: JP-A-2016-23984

SUMMARY OF THE INVENTION

Problem to be Solved by the Invention

However, even in the method of the Patent Document 1, it is necessary to repeat a lot of friction tests for evaluating the slip rate dependency, thereby causing an increase in time and cost. Further, even if the friction coefficient is aligned with the target value according to the polishing treatment, it is hard to regenerate concavity and convexity which is inherently provided in the road surface, and it is thought that the slip rate dependency of the friction coefficient cannot be reproduced due to the change in a frequency input of the road surface.

The present invention is made by paying attention to the problem mentioned above, and an object of the present invention is to provide a rubber friction test method which can precisely measure a friction coefficient between a test road surface and a rubber test specimen with a reduced number of tests.

Means for Solving the Problem

The present invention takes the following means for achieving the object mentioned above.

More specifically, a rubber friction test method according to the present invention is a rubber friction test method of measuring a friction coefficient of a rubber test specimen by relatively moving the rubber test specimen and a test road surface in a state in which the rubber test specimen is pressed to the test road surface by applying a load, the method including a step of measuring a resistance force acting on the rubber test specimen while accelerating or decelerating a speed of the relative movement, and a step of calculating the friction coefficient based on the applied load and the measured resistance force.

According to the structure, it is possible to measure the resistance force while changing the slip rate by accelerating or decelerating the speed of the relative movement between the rubber test specimen and the test road surface. As a result, it is not necessary to carry out a lot of friction tests in which the slip rate is differentiated, and it is possible to prevent the test road surface from being polished and prevent the property of the road surface from changing. Therefore, it is possible to precisely measure the friction coefficient between the test road surface and the rubber test specimen with a reduced number of tests.

In the present invention, it is preferable that the measurement of the resistance force is carried out while straightly moving the rubber test specimen attached to a holder in relation to the stationary test road surface, and the friction coefficient is calculated in the step of calculating the friction coefficient by using a frictional force obtained by compensating the resistance force with an inertial force acting on the rubber test specimen and the holder.

According to the structure, it is possible to calculate the friction coefficient by using the frictional force actually acting on the rubber test specimen, according to the compensation of the inertial force acting on the rubber test specimen and the holder when accelerating or decelerating the slip rate.

In the present invention, it is preferable to apply the load to the rubber test specimen at a predetermined speed, before the step of measuring the resistance force.

According to the structure, it is possible to measure the friction coefficient while taking into consideration a change in a real contact area caused by the time until the load is applied.

In the present invention, it is preferable to press the rubber test specimen to the test road surface for a predetermined contact time before the step of measuring the resistance force.

According to the structure, it is possible to measure the friction coefficient while taking into consideration a change in the real contact area caused by the contact time.

DETAILED DESCRIPTION OF THE PREFERRED EMBODIMENTS

A description will be given below according to the present invention with reference to the accompanying drawings.

Figure 1:
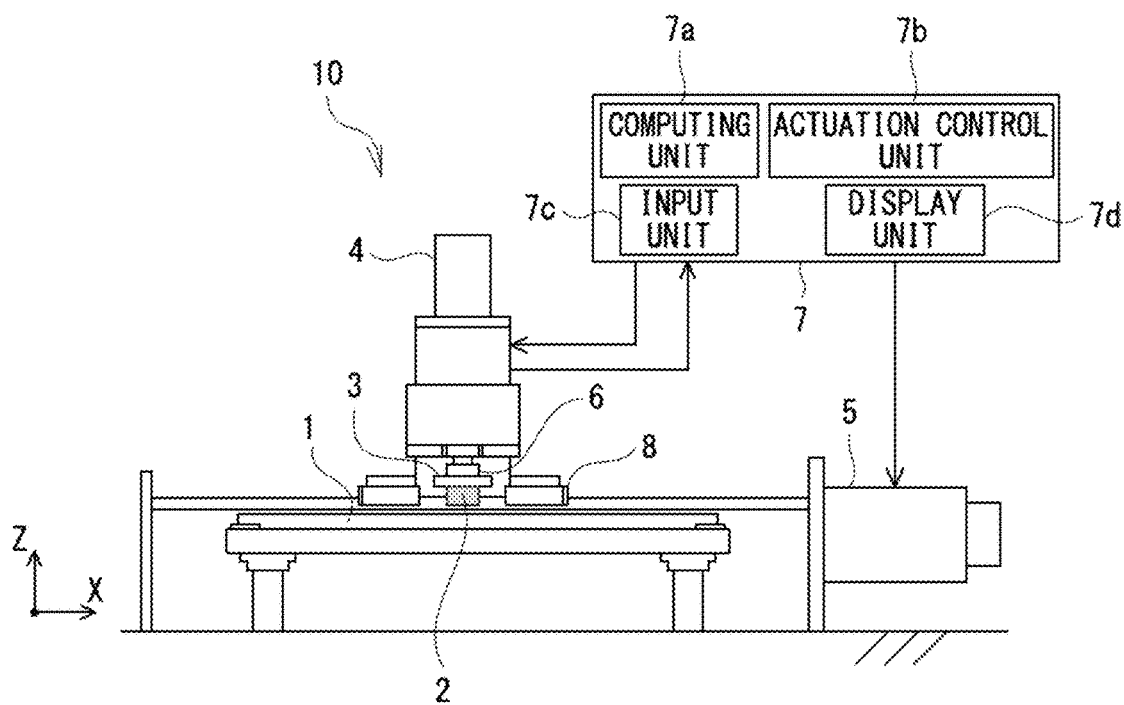
FIG. 1 is a view schematically showing an example of a rubber friction testing machine.

In the present embodiment, there is shown an example in which a friction coefficient between a test road surface 1 and a rubber test specimen 2 is measured by using a rubber friction testing machine 10 shown in FIG. 1. A rubber friction test method according to the present invention is not limited to the method which is executed by using the rubber friction testing machine mentioned above. The rubber friction testing machine 10 is provided with a test road surface 1 which is structured by simulating an actual road surface, a holder 3 which retains the rubber test specimen 2, a loading device 4 which presses the rubber test specimen 2 to the test road surface 1, a drive unit 5 which is provided for relatively moving the rubber test specimen 2 in relation to the test road surface 1, a load, sensor 6 which measures a load acting on the rubber test specimen 2, and a control device 7 which controls necessary motions for testing.

The test road surface 1 is structured by simulating the actual road surface such as an asphalt road surface and a concrete road surface. The test road surface 1 is formed by firmly fixing an aggregate actually used in the road, or a hard aggregate having the same property with an adhesive agent. Alternatively, the test road surface 1 is formed by cutting out the road surface from the actual road and processing it for measuring. The method of forming the test road surface 1 may employ the other methods and is not limited particularly. A surface of the test road surface 1 is formed flat as a whole in spite of some concavities and convexities due to the aggregate. Further, the test road surface 1 may employ an abrasive cloth.

The rubber test specimen 2 is manufactured by a vulcanized rubber, and has a flat surface which is pressed to the test road surface 1. In the example of FIG. 1, the rubber test specimen 2 is formed into a complete rectangular parallelepiped shape, and an upper surface thereof is bonded to a plate-shaped holder 3. Therefore, a lower surface of the rubber test specimen 2 facing the test road surface 1 forms a flat surface which is pressed to the test road surface 1. A shape of the rubber test specimen 2 is not particularly limited, but the rubber test specimen 2 may be formed, for example, by cutting out a tread rubber of a tire and may be bonded to the holder 3.

The holder 3 is connected to the loading device 4. The loading device 4 is structured such as to be capable of reciprocating the holder 3 along a direction of Z (a vertical direction in FIG. 1) which is perpendicular to the test road surface 1. It is possible to adjust a load in the direction of Z input to the rubber test specimen 2 by appropriately setting a position of the holder 3 (a distance between the holder 3 and the test road surface 1), and it is further possible to press the rubber test specimen 2 to the test road surface 1 under a predetermined pressure condition. Further, the loading device 4 can adjust a moving speed of the holder 3 in the direction of Z, and can accordingly adjust a speed which applies the load to the rubber test specimen 2. The loading device 4 is constructed by a servo motor, however, may utilize the other actuator mechanisms.

The drive unit 5 is structured such as to be capable of reciprocating a table 8 supporting the loading device 4 along a direction of X (a lateral direction in FIG. 1). The holder 3 moves on the basis of the movement of the table 8, and it is possible to move the rubber test specimen 2 on the test road surface 1 while sliding. Further, the drive unit 5 can adjust a moving speed of the table 8 in the direction of X, and can accordingly adjust a slip rate of the rubber test specimen 2 in relation to the test road surface 1. In the present embodiment, the drive unit 5 is constructed by the servo motor, however, is not limited to this.

The load sensor 6 can measure the load of a vertical component and two horizontal components, totally three components, and can measure a load in the direction of Z (a vertical force), a load in the direction of X (a longitudinal force), and a load in a direction of Y (a lateral force) which act on the rubber test specimen 2. The load sensor 6 is constructed, for example, by a load cell. In the present embodiment, the load sensor 6 serves as a resistance force measurement unit. In the present embodiment, the load sensor 6 is attached to an upper side of the holder 3 (an opposite side to the rubber test specimen 2).

The control device 7 is provided with a computing unit 7a which carries out necessary computation for calculating the friction coefficient, an actuation control unit 7b which controls an operation of the loading device 4 and the drive unit 5, an input unit 7c which accepts an input from a test worker, and a display unit 7d which displays various information relating to the operation and the setting of the rubber friction testing machine 10 on a screen. A value measured by the load sensor 6 is transmitted to the control device 7, and the computing unit 7a calculates the friction coefficient based on the measured value.

Further, the rubber friction testing machine 10 may be provided with a temperature regulating device (not shown) which adjusts temperatures of the test road surface 1, the rubber test specimen 2, and their peripheral atmosphere. A heating device and a cooling device can be listed up as the temperature regulating device. The temperature regulating device is controlled by the control device 7.

In a rubber friction test, the friction coefficient of the rubber test specimen 2 is measured by relatively moving the rubber test specimen 2 and the test read surface 1 in a state in which the rubber test specimen 2 is pressed to the test road surface 1 by applying the load. In the present embodiment, the friction coefficient between the test road surface 1 and the rubber test specimen 2 is measured by linearly moving the rubber test specimen 2 in relation to the stationary test road surface 1 in a state in which the rubber test specimen 2 is pressed to the test road surface 1 by applying the load with the loading device 4. The rubber friction testing machine 10 according to the present embodiment can measure both of a static friction coefficient and a kinetic friction coefficient. In the method of measuring the friction coefficient by pressing the rubber test specimen to the test road surface while rotating as described in the Patent Document 1, the rubber test specimen swings and moves on the test road surface. As a result, a speed difference is generated in a contact surface of the rubber test specimen due to the distance of the test road surface from a center of rotation and it is hard to accurately measure the friction coefficient. In the test method according to the present invention, since the rubber test specimen 2 is linearly moved in place of the swing motion on the test road surface 1, the generation of the speed difference in the contact surface can be suppressed, and it is possible to precisely measure the friction coefficient between the test road surface 1 and the rubber test specimen 2.

Figure 2:
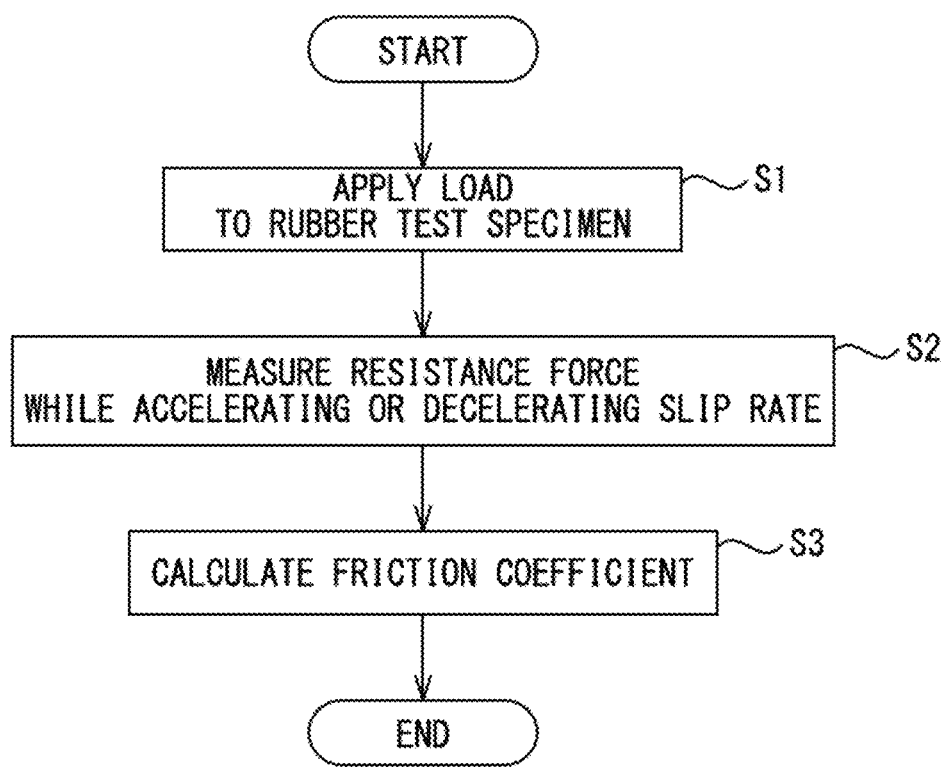
FIG. 2 is a flow chart showing a rubber friction test method according to the present invention.

A description will be given of an example of the rubber friction test method using the rubber friction testing machine 10 mentioned above with reference to FIGS. 1 and 2.

First of all, in a step S1, the rubber friction testing machine 10 executes a load applying step. The load applying step applies a predetermined load Fz to the rubber test specimen 2. Specifically, the holder 3 comes down little by little, and the loading device 4 is controlled in such a manner that the load applied to the rubber test specimen 2 comes to a predetermined load Fz. The load Fz is set, for example, in such a manner that the pressure which the rubber test specimen 2 presses the test road surface 1 is between 10 and 1000 KPa.

In the next step S2, the rubber friction testing machine 10 executes a friction step. The friction step measures the resistance force acting on the rubber test specimen 2 while linearly moving the rubber test specimen 2 along the direction of X in a state in which the rubber test specimen 2 is pressed to the test road surface 1 with the predetermined load Fz. Specifically, the drive unit 5 is controlled in such a manner that the rubber test specimen 2 moves on the test road surface 1 at a predetermined slip rate V, and a load Fx in the direction of X acting on the rubber test specimen 2 is measured by the load sensor 6. The load Fx corresponds to the resistance force.

Figure 3:
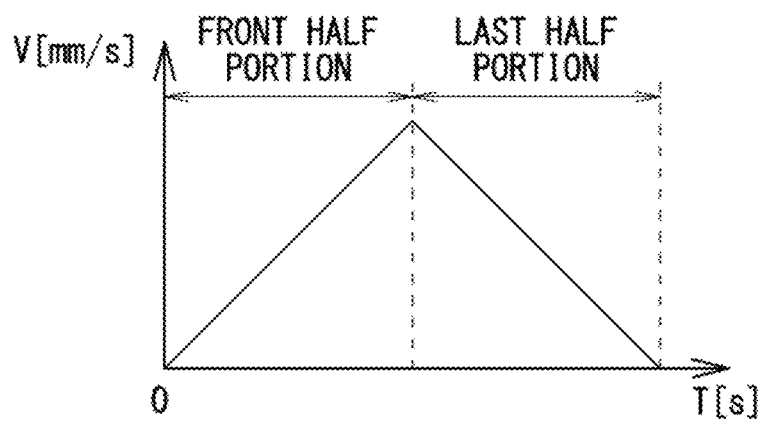
FIG. 3 is a view showing a relationship between a slip rate and a time.

The friction step according to the present embodiment is provided with a front half portion in which the slip rate V of the rubber test specimen 2 accelerates with a fixed acceleration, and a last half portion in which the slip rate V decelerates at a fixed acceleration, as shown in FIG. 3. The acceleration of the front half portion and the acceleration of the last half portion are the same.

In the next step S3, the rubber friction testing machine 10 executes a friction coefficient calculating step. The friction coefficient calculating step calculates a friction coefficient $\mu$ based on the applied load Fz and the measured resistance force Fx. Specifically, the resistance force Fx measured by the load sensor 6 is transmitted to the control device 7, and the computing unit 7a computes the friction coefficient based on the resistance force Fx and the load Fz. The resistance force Fx includes an inertial force acting on the rubber test specimen 2 and the holder 3. The inertial force is an inertial force which is measured by the load sensor 6 in a state in which the rubber test specimen 2 is attached to the holder 3. It is possible to obtain the frictional force actually acting on the rubber test specimen 2 by compensating the resistance force Fx with the inertial force, and the friction coefficient $\mu$ is calculated by using the frictional force.

The load Fz, the speed applying the load Fz, the slip rate V, the temperature of the test road surface 1, and the temperature of the rubber test specimen 2 are set based on the values obtained by measuring or forecasting the speed and the load of the tread block in the actual tire in three directions. As a result, it is possible to carry put the friction test under a condition which is in conformity to the actual tire.

Other Embodiments

In the load applying step, the load may be applied to the rubber test specimen 2 at a predetermined speed. As a result, it is possible to measure the friction coefficient while taking into consideration a change in a real contact area due to the tire until the set load Fz is applied, and it is particularly possible to precisely measure the static friction coefficient. The predetermined speed is set in a range of a grounding speed (which is changed according to the speed of rotation of the tire) in the actual tire. The predetermined speed is about between 1 and 10000 mm/s.

Further, the rubber test specimen 2 may be pressed to the test road surface 1 for a predetermined contact time before the friction step, that is, the step of measuring the resistance force. As a result, it is possible to measure the friction coefficient while taking into consideration the change in the real contact area due to the contact time until starting the friction step, and it is particularly possible to precisely measure the static friction coefficient. The predetermined contact time is about 0 to 10 seconds.

Further, in the friction step, the load Fz may be changed. As a result, it is possible to evaluate a pressure dependency of the friction coefficient.

Figure 4A:
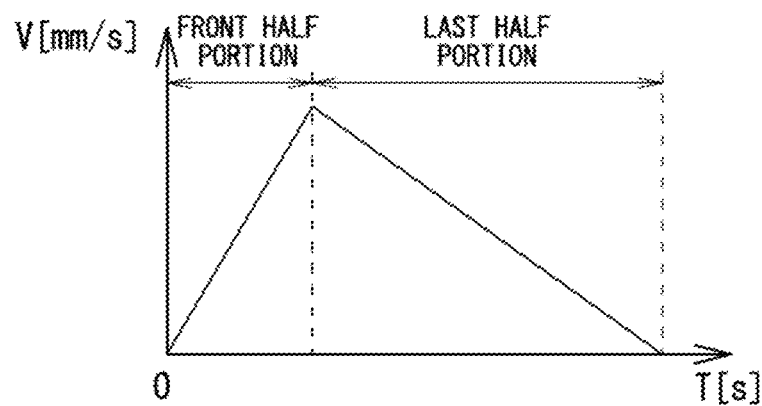
FIGS. 4A and 4B are a view showing a relationship between a slip rate and a time according to the other embodiment.
Figure 4B:
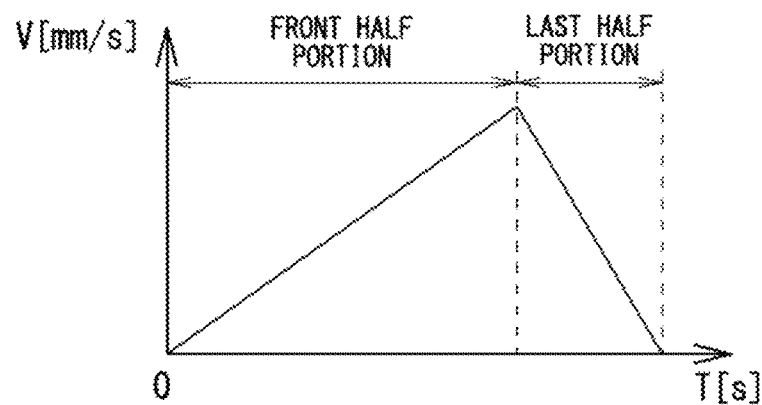

In the embodiment mentioned above, the slip rate V is accelerated or decelerated at the same acceleration in the front half portion and the last half portion of the friction step, however, the acceleration in the front half portion and the last half portion may be differentiated. For example, the acceleration in the front half portion may be made larger than the acceleration in the last half portion, as shown in FIG. 4A, or the acceleration in the last half portion may be made larger than the acceleration in the front half portion, as shown in FIG. 4B.

Further, in the embodiment mentioned above, the slip rate V is accelerated or decelerated continuously at the fixed acceleration in the friction step, however, it is not necessary to make the acceleration fixed, and it is not necessary to continuously accelerate or decelerate.

The description is given above of the embodiments according to the present invention with reference to the accompanying drawings. However, it should be thought that the specific structure is not limited to these embodiments. The scope of the present invention is defined by claims without being limited to the description of the embodiments mentioned above, and further includes all the modifications within the meanings and range which are equivalent to the claims.

The structure employed in each of the embodiments mentioned above can be employed in the other optional embodiments. The specific structure of each of the portions is not limited only to the embodiments mentioned above, but can be variously modified within the range which does not deflect from the scope of the present invention.

What is claimed is:

1. A rubber friction test method of measuring a friction coefficient of a rubber test specimen by relatively moving the rubber test specimen and a test road surface in a state in which the rubber test specimen is pressed to the test road surface by applying a load,
   wherein the method comprises:
   a step of measuring a resistance force acting on the rubber test specimen while accelerating or decelerating a speed of the relative movement wherein the measurement of the resistance force is carried out while straightly moving the rubber test specimen attached to a holder in relation to the stationary test road surface; and
   a step of calculating the friction coefficient based on the applied load and the measured resistance force, the friction coefficient is calculated in the step of calculating the friction coefficient by using a frictional force obtained by compensating the resistance force with an inertial force acting on the rubber test specimen and the holder.

2. The rubber friction test method according to claim 1, wherein the load is applied to the rubber test specimen at a predetermined speed, before the step of measuring the resistance force.

3. The rubber friction test method according to claim 1, wherein the rubber test specimen is pressed to the test road surface for a predetermined contact time before the step of measuring the resistance force.

4. The rubber friction test method according to claim 1, wherein the step of measuring the resistance force accelerates or decelerates a speed of the relative movement at a fixed acceleration.

5. The rubber friction test method according to claim 1, wherein the step of measuring the resistance force includes a front half portion which accelerates a speed of the relative movement at a fixed acceleration, and a last half portion which decelerates the speed of the relative movement at a fixed acceleration which has the same magnitude as that of the front half portion.

6. The rubber friction test method according to claim 1, wherein the step of measuring the resistance force includes a front half portion which accelerates a speed of the relative movement at a fixed acceleration, and a last half portion which decelerates the speed of the relative movement at a fixed acceleration which has a different magnitude from that of the front half portion.

7. A rubber friction test method of measuring a friction coefficient of a rubber test specimen by relatively moving the rubber test specimen and a test road surface in a state in which the rubber test specimen is pressed to the test road surface by applying a load,
wherein the method comprises:
a step of measuring a resistance force acting on the rubber test specimen while accelerating or decelerating a speed of the relative movement; and
a step of calculating the friction coefficient based on the applied load and the measured resistance force,
wherein the load is applied to the rubber test specimen at a predetermined speed, before the step of measuring the resistance force.

8. The rubber friction test method according to claim 7, wherein the measurement of the resistance force is carried out while straightly moving the rubber test specimen attached to a holder in relation to the stationary test road surface, and
the friction coefficient is calculated in the step of calculating the friction coefficient by using a frictional force obtained by compensating the resistance force with an inertial force acting on the rubber test specimen and the holder.

9. The rubber friction test method according to claim 7, wherein the rubber test specimen is pressed to the test road surface for a predetermined contact time before the step of measuring the resistance force.

10. The rubber friction test method according to claim 7, wherein the step of measuring the resistance force accelerates or decelerates a speed of the relative movement at a fixed acceleration.

11. The rubber friction test method according to claim 7, wherein the step of measuring the resistance force includes a front half portion which accelerates a speed of the relative movement at a fixed acceleration, and a last half portion which decelerates the speed of the relative movement at a fixed acceleration which has the same magnitude as that of the front half portion.

12. The rubber friction test method according to claim 7, wherein the step of measuring the resistance force includes a front half portion which accelerates a speed of the relative movement at a fixed acceleration, and a last half portion which decelerates the speed of the relative movement at a fixed acceleration which has a different magnitude from that of the front half portion.

13. A rubber friction test method of measuring a friction coefficient of a rubber test specimen by relatively moving the rubber test specimen and a test road surface in a state in which the rubber test specimen is pressed to the test road surface by applying a load,
wherein the method comprises:
a step of measuring a resistance force acting on the rubber test specimen while accelerating or decelerating a speed of the relative movement; and
a step of calculating the friction coefficient based on the applied load and the measured resistance force,
wherein the step of measuring the resistance force includes a front half portion which accelerates a speed of the relative movement at a fixed acceleration, and
a last half portion which decelerates the speed of the relative movement at a fixed acceleration which has
(i) the same magnitude as that of the front half portion; or
(ii) a difference magnitude from that of the front half portion.

14. The rubber friction test method according to claim 13, wherein the last half portion which decelerates the speed of the relative movement at a fixed acceleration which has the same magnitude as that of the front half portion.

15. The rubber friction test method according to claim 13, wherein the last half portion which decelerates the speed of the relative movement at a fixed acceleration which has a different magnitude from that of the front half portion.

16. The rubber friction test method according to claim 13, wherein the measurement of the resistance force is carried out while straightly moving the rubber test specimen attached to a holder in relation to the stationary test road surface, and
the friction coefficient is calculated in the step of calculating the friction coefficient by using a frictional force obtained by compensating the resistance force with an inertial force acting on the rubber test specimen and the holder.

17. The rubber friction test method according to claim 13, wherein the load is applied to the rubber test specimen at a predetermined speed, before the step of measuring the resistance force.

18. The rubber friction test method according to claim 13, wherein the rubber test specimen is pressed to the test road surface for a predetermined contact time before the step of measuring the resistance force.

19. The rubber friction test method according to claim 13, wherein the step of measuring the resistance force accelerates or decelerates a speed of the relative movement at a fixed acceleration.

* * * * *